3,038,327
GEL TIME METER
Willard B. Resnick, Wayzata, Minn., assignor to American Petrochemical Corporation, Minneapolis, Minn., a corporation of Minnesota
Filed Jan. 30, 1961, Ser. No. 85,762
6 Claims. (Cl. 73—53)

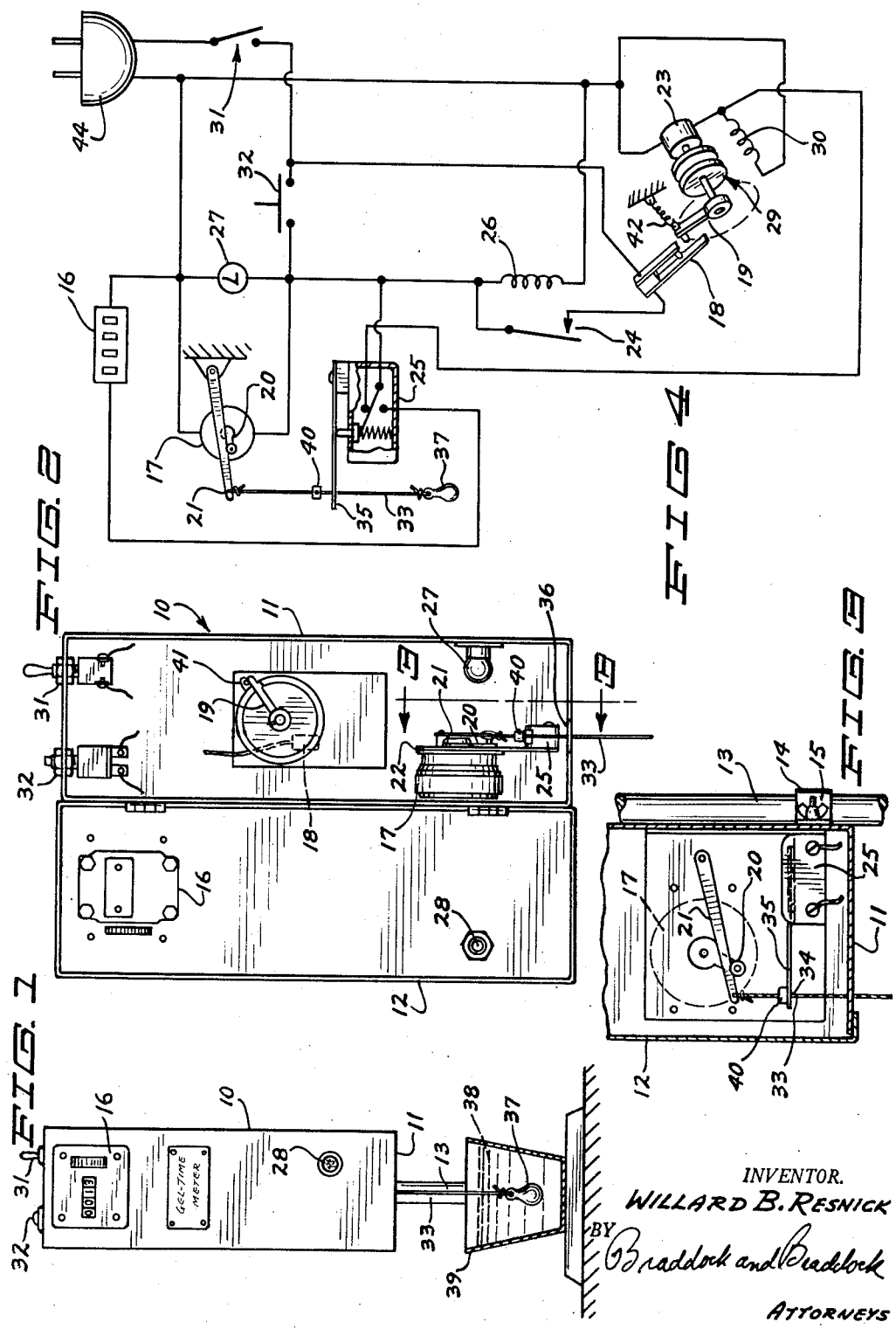

The present invention has relation to a device for measuring the length of time necessary for a given solution to gel.

Present devices on the market that are used for measuring the length of gelation time for a given substance are expensive and are not completely reliable. Some of the meters presently used depend upon change in viscosity to indicate when the solution has gelled. This type of measurement is not always accurate as before the liquid gels there is a transition phase in the solution at which the viscosity of the solution increases greatly but a true gel has not been reached. Other devices employ expensive sensing elements that are subject to damage and when they become coated with the substance they are measuring they have to be replaced. Replacement of these elements is difficult.

The present invention discloses a compact low cost gel time meter using standard components. The meter is not dependent upon the viscosity of the liquid that is being timed, but accurately measures the time necessary to reach the true gel point. The sensing element used with the gel time meter is a standard fishing line sinker available at any hardware store and is easily replaceable once it has been coated with the solution being checked.

The gelation time is defined as the time taken at a certain temperature for a liquid to gel. The measurements can be used for determining many things, for example, how long it takes resins to polymerize or jello or gelatin to set, or may be used for determining the length of time it takes to form a surface skin on a paint sample. The setting time of concrete, plaster or similar substances can be measured with the device.

The device as disclosed, is used with an ordinary paper cup to hold the sample that is being timed. This permits disposal of both the sensing element and the container for the sample when the test has been completed, without incurring great expense.

It is extremely important in laboratory work to have a reliable, low cost gel time meter. In many products there are numerous variable components and each may effect the end product. With a low cost highly reliable gel time meter, as disclosed in the present invention, a laboratory can be equipped with several time meters to enable chemists and technicians to run several tests simultaneously to determine the effect different variable components have on the gel point of the end product. The labortary may have a controlled atmosphere to insure accurate, comparative results.

It is an object of the present invention to present a gel time meter that uses standard timing components and has a low cost disposable sensing element.

In the drawings,

FIG. 1 is a front elevational view of a gel time meter made according to the present invention and showing a sensing element and a container filled with a solution to be timed;

FIG. 2 is a front elevational view of the device of FIG. 1 with a cabinet door open to show the interior components;

FIG. 3 is a side elevational view of a drive motor taken as on line 3—3 in FIG. 2; and FIG. 4 is a schematic representation of an electrical circuit used in connection with the gel time meter.

Referring to the drawings and numerals of reference thereon, a gel time meter indicated generally at 10 includes an outer cabinet 11 having a door 12.

A standard electrically operated counter 16 of any usual or preferred construction is mounted on the door of the cabinet. A synchronous drive motor 17 is mounted inside the cabinet and has a crank arm 20 that is drivably attached to an output shaft on the motor and is adapted to rotate at one revolution per minute. A crank arm follower 21 is pivotally attached with respect to a mounting plate 22 and rides on the end of the crank arm 20. As the crank arm rotates the outer end of the crank arm follower moves up and down. A synchronous timer motor 23 is positioned in the cabinet and may be connected through a normally released clutch 29 that may be engaged with a clutch solenoid 30 to drive a rotatably mounted arm 19, as best seen in FIG. 4. A spring 42 urges the arm 19 to rotate in a first direction to a starting position against a lug 41. The spring return arm 19 is positioned to contact and open a normally closed master switch 18 after the arm has rotated a predetermined length of time. The master switch 18 in turn controls power flow to the entire gel time meter circuit. A normally open lock in switch 24, that is closed and locked in when a holding coil 26 is energized, is wired in series with the master switch 18.

A microswitch 25 is located in the circuit and in a first normal position serves to energize the clutch engaging solenoid 30, that in turn engages the clutch 29. In this first position, the microswitch also serves to energize timer motor 23 so that the timer motor 23 drives arm 19. In a second position the microswitch closes a circuit to trip the counter 16 and simultaneously interrupts the circuit to the clutch 29 and timer motor 23. An indicating device or indicator lamp 27 is wired in parallel with the drive motor 17 and is on whenever the drive motor is energized. A red lens 28 is positioned in the door 12 directly in front of the indicator lamp 27. A manual on-off switch 31 and a normally open push button reset switch 32 are located in the circuit and are positioned in the cabinet so that they may be operated without opening the door 12. The reset switch 32 has to be manually closed to initially energize coil 26 to close lock-in switch 24, thus to provide a current path in parallel with the push button switch 32 continually providing power to coil 26.

An actuator cord 33 is fastened to the crank arm follower 21 and extends down through a provided eye 34 in a microswitch activating lever 35. A collar 40 is positioned on the actuator cord above the microswitch activating lever 35 and may be vertically adjusted on the cord. The actuator cord 33 extends down through a provided hole 36 in the bottom of the cabinet 11 and a sensing element 37, which may be an ordinary fishing sinker, is fixedly attached with respect to the lower end of the actuator cord.

A solution that is to be checked for the length of gel time, indicated in dotted lines as at 38, is placed in a container 39, such as a paper cup. The paper cup is positioned on stand 13 and directly below sensing element 37 so that the element will become immersed in the solution when the element is below a predetermined point in its travel. The collar 40 is adjusted to move the microswitch activating lever 35 to position to move the microswitch 25 from its first position to its second position when the sensing element goes below the predetermined point.

*Operation*

A suitable solution that is to be checked for gel time, such as a resin or gelatine, may be placed in a container 39 and located directly below the sensing element 37. The sensing element will be of sufficient weight so that in a high viscosity solution it will immerse and yet will not break through a low strength gel when the gel point has been reached. In practice two different weights have been found to be sufficient to cover the entire range of solutions checked.

With a power cord plug 44 connected to a suitable source of power (not shown) and the main power switch 31 placed in the "on" or closed position, the reset button 32 will be pushed and the coil 26 will then become energized. The lock-in switch 24 will close. The push button may then be released, as the switch 24 will serve to power the timer circuit. The drive motor 17 is energized and will rotate the crank arm 20 at the rate of one revolution per minute, the indicator lamp 27 is on and with the microswitch 25 in its first position, the timer motor 23 is running. Clutch solenoid 30 is energized and the clutch 29 engaged. The arm 19 will be adjusted to rotate from its starting position against lug 41, as best seen in FIG. 2, for a period longer than one minute before contacting and opening the master switch 18.

The crank arm follower 21 will then move upwardly for thirty seconds and downwardly for thirty seconds. During this time the actuator cord 33 will also move upwardly and downwardly. At the bottom of the stroke, when the sensing element goes below a predetermined point and has immersed in the solution 38, the collar 40 will engage the actuating lever 35 of microswitch 25 and will depress the lever under the weight of the sensing element. At this time the microswitch will move to its second position and trip the electric counter 16 to indicate one more minute. The clutch solenoid will be de-energized to disengage the clutch and timer motor 23 will stop. The spring 42 of arm 19 will then act to return the arm to its starting or zero position before it has been able to open master switch 18. When the crank arm follower 21 begins to travel upwardly, the actuator cord 33 will also go upwardly and will raise the sensing element 37. The collar 40 on the actuator cord 33 will raise and will release the microswitch activating lever 35. The microswitch will again go to its first or normal position and complete the circuit to energize the clutch solenoid 30 and the timer motor 23. The clutch will engage and arm 19 will again be driven by the timer motor 23. As long as the weight of sensing element 37 continues to act through collar 40 on the microswitch actuating lever 35 to trip and disengage clutch 30 before the arm 19 opens the master switch 18 the cycle will repeat. For each cycle of the crank arm 20 and the sensing element the counter will indicate an additional number. This will show how many minutes have passed since the gel time meter was started.

When the solution gels, the sensing element 37 will be supported by the gel and will no longer exert sufficient weight on collar 40 to depress the actuator lever 35 for the microswitch as it will no longer go below the predetermined point of its travel. The counter will no longer be tripped and as the clutch will still be engaged, the arm 19 will continue to be driven until it opens master switch 18. When the master switch opens, the complete timer circuit is de-energized, including the coil 26 which will cause the switch 24 to open and will stop the drive motor 17 and shut off the indicator lamp and the other components. The circuit will not be energized again until the reset button has been pushed.

The number of minutes that the solution took to gel will be shown on the counter and in this way, when the attendant sees the indicator light is out, he knows that the solution has gelled and will be able to read the time that it took to gel. This counter reading will be accurate to the nearest minute.

What is claimed is:

1. An elapsed time meter for determining the happening of a particular event, said meter including an event sensing device movable from a first remote position to a second event sensing position, a drive motor operably associated with said sensing device to drive it between said first remote and second sensing positions once during each of a number of uniform consecutive predetermined first periods of time, an event indicating device, a timer including a timer motor effective to cause said indicating device to indicate happening of said event only upon continuous actuation of said timer motor for a second predetermined period of time, means for interrupting operation of said timer responsive to arrival of said sensing device at said second position, means for initiating actuation of said timer motor after operation of said timer interrupting means, said initiating means being operative to actuate said timer motor preceding the next subsequent operation of said timer actuation interrupting means by a third period of time which is shorter than said second period, a counting mechanism for recording the number of times said event sensing device moves to said second position, and said interrupting device being ineffective to interrupt actuation of said timer upon arrival of said sensing device at said second position after the happening of said event.

2. An elapsed time meter for detecting a change of state of a medium, said meter including a drive motor, a sensing element operably associated with said drive motor and said medium and adapted to cycle vertically up and down at a constant predetermined frequency, a timer, a master shutdown control, an actuator arm positioned to contact siad master shutdown control, releasable means drivably coupling said timer to said arm, biasing means urging said arm toward a starting position away from said master shutdown control, said master shutdown control being positioned to disable said drive motor when said control is contacted by said actuator arm, means operably associated with said sensing element to release said releasable means when said sensing element is below a predetermined point of its cycle thus to enable said arm to return to its starting position under the action of said biasing means, said timer being operative to drive said arm from said starting position to position in contact wtih said master control during a period of time longer than the period of time said sensing element is above said predetermined point during one complete cycle of said element, and means operable to count the number of completed cycles of said sensing element, said sensing element being associated with said medium in such a manner that it cannot move below said predetermined point when the change of state to be detected has occurred.

3. An elapsed time meter for detecting a change of state of a medium, said meter including a constant speed drive motor, a sensing element operably associated with said drive motor and said medium and adapted to cycle up and down at a constant predetermined frequency, a timer motor, a normally open lock-in switch to control said timer motor and said drive motor, a holding coil positioned to close said lock-in switch when said coil is energized, a normally closed master switch, an actuator arm positioned to contact and open said master switch, releasable means drivably coupling said timer motor to said arm, biasing means urging said arm toward a starting position away from said master switch, said master switch being electrically connected in a manner to relax said holding coil when said switch is contacted and opened by said arm, means operably associated wtih said sensing element to release said actuator arm from driving relationship with said timer motor when said sensing element is below a predetermined point of its cycle thus to enable said arm to return to its starting position under the action of said biasing means, said timer motor being operative to drive said arm from said starting position to position in contact with said master switch during a period of time longer than the period of time said sensing element is above said predetermined point during one complete cycle of said element, and means operable to count the number of completed cycles of said sensing element, said sensing element being associated with said medium in such a manner that it cannot move below said predetermined point when the change of state to be detected has occurred.

4. A gel time meter for determining the length of time necessary for a given solution to reach its gel point, said meter including a cabinet adapted to be mounted on a stand, a constant speed drive motor mounted with respect to said cabinet and having an outwardly extending drive shaft, a crank arm drivably mounted on said drive shaft, a crank arm follower pivotally mounted with respect to said cabinet and operably associated with said crank arm so that upon rotational movement of said crank arm said follower moves alternately up and down, a sensing element operably associated with said crank arm follower spaced from said pivot point and operably associated with the solution to be timed, a timer motor mounted in said cabinet, an actuator arm rotatably mounted with respect to said timer motor, biasing means urging said actuator arm to rotate in a first direction to a starting position, a clutch operably associated with said timer motor and said arm and movable from a first normally disengaged position to a second position wherein said clutch engages and said timer motor drives said actuator arm in a second direction, a solenoid operable to move said clutch to said second position, a normally closed master switch positioned to be opened by said actuator arm when said actuator arm is rotated a predetermined length of time in said second direction, said master switch being electrically connected to de-energize said drive motor, said solenoid and said timer motor when it is opened, manually resettable means to keep said drive motor, said solenoid and said timer motor de-energized when said master switch once opens, a trip switch operably associated with said sensing element and movable to position to de-energize said clutch solenoid independent of said master switch whenever said sensing element is below a predetermined point in its travel, said sensing element normally being operable to move said trip switch to de-energize said clutch solenoid before said master switch is opened by said actuator arm, and means operable to count the number of times said sensing element goes below said predetermined point, said sensing element being associated with said solution in such a manner that it cannot move below said predetermined point when the solution to be timed has reached its gel point.

5. A gel time meter for determining the length of time necessary for a given solution to reach its gel point, said meter including a cabinet adapted to be mounted on a stand, a constant speed drive motor mounted with respect to said cabinet and having an outwardly extending drive shaft, a crank arm drivably fastened with respect to said drive shaft, a crank arm follower pivotally mounted with respect to said cabinet and operably associated with said crank arm so that upon rotation of said crank arm, said follower moves up and down, a sensing element operably associated with said crank arm follower spaced from said pivot point and operably associated with the solution to be timed, a timer motor mounted in said cabinet, an actuator arm rotatably mounted with respect to said timer motor, resilient means urging said actuator arm in a first direction toward a starting position, a clutch operably associated with said timer motor and said actuator arm and movable from a first normally disengaged position to a second position wherein said clutch is engaged and said timer motor drives said actuator arm in a second direction, a solenoid electrically connected in parallel with said timer motor, said solenoid being operable to move said clutch to said second position, a normally open lock-in switch connected to control said timer, said solenoid and said drive motor, a holding coil positioned to close said lock-in switch when said coil is energized, a normally closed master switch electrically connected in series with said lock-in switch and positioned to be opened by said actuator arm when said actuator arm has traveled a predetermined length of time in said second direction, said master switch being connected to relax said holding coil when said master switch is opened by said arm, a trip switch actuated responsive to said sensing element and operable to de-energize said clutch solenoid independent of said master switch when said sensing element is below a predetermined point of its movement, said trip switch being operable to de-energize said solenoid before said cut-out switch is opened by said arm whenever said sensing element goes below said predetermined point, a normally open manually closable switch connected in series with said holding coil and in parallel with said lock-in switch, and means operable to count the number of times said sensing element goes below said predetermined point, said sensing element being associated with said solution in such a manner that it cannot move below said predetermined point when the solution to be timed has reached its gel point.

6. The combination as specified in claim 5 and an indicator lamp electrically connected in parallel with said drive motor.

References Cited in the file of this patent

UNITED STATES PATENTS

| 2,056,690 | Slye | Oct. 6, 1936 |
| 2,129,043 | Bortsch | Sept. 6, 1938 |
| 2,317,538 | Lamar | Apr. 27, 1943 |

OTHER REFERENCES

Publication by S. B. Stoker, entitled "Multiple Coagulometer," appearing in Journal of Scientific Instruments, vol. 22, No. 8, August 1945, pp. 146–148. (Copy in Scientific Library.)